No. 771,498. PATENTED OCT. 4, 1904.
I. L. ROBERTS.
ELECTRIC BATTERY.
APPLICATION FILED OCT. 14, 1903.
NO MODEL.

Witnesses:
a. E. Mahan
A. S. Dunham

Isaiah L. Roberts, Inventor
by Kerr, Page & Cooper Att'ys

No. 771,498.

Patented October 4, 1904.

UNITED STATES PATENT OFFICE.

ISAIAH L. ROBERTS, OF NEW YORK, N. Y., ASSIGNOR TO ECONOMIC ELECTRIC COMPANY, A CORPORATION OF NEW YORK.

ELECTRIC BATTERY.

SPECIFICATION forming part of Letters Patent No. 771,498, dated October 4, 1904.

Application filed October 14, 1903. Serial No. 176,960. (No model.)

*To all whom it may concern:*

Be it known that I, ISAIAH L. ROBERTS, a citizen of the United States, residing in the city of New York, county of Kings, and State of New York, have invented certain new and useful Improvements in Electric Batteries, of which the following is a specification, reference being had to the drawings accompanying and forming part of the same.

My invention relates more particularly to that class of batteries known as "dry cells," and has for its chief objects to prolong the life of the depolarizing agent and to increase the quantity of energy delivered. Heretofore such batteries have been made by placing various depolarizing compounds, electrolytes, and excitants, together with the electrodes, in an air-tight vessel and sealing the same, so as to exclude the air. In a cell so constructed reliance for depolarization is placed solely on the depolarizing agent sealed in the receptacle, with the result that when this agent is exhausted the battery is useless.

I have found, however, that if an oxygen-absorbing depolarizer is used in the cell and air is permitted to permeate the depolarizing and conducting mass the oxygen consumed from the former will be restored to the depolizer from the air, thereby securing the advantages mentioned above.

Although a battery embodying my invention may be constructed in various ways, I have devised a novel form which has been found to give particularly good results, and it is therefore the form which I prefer to use. Any "dry" battery construction, however, in which the oxygen consumed in the battery is drawn from the air or other atmospheric medium directly or indirectly is clearly within the scope of my invention.

Figure 1:
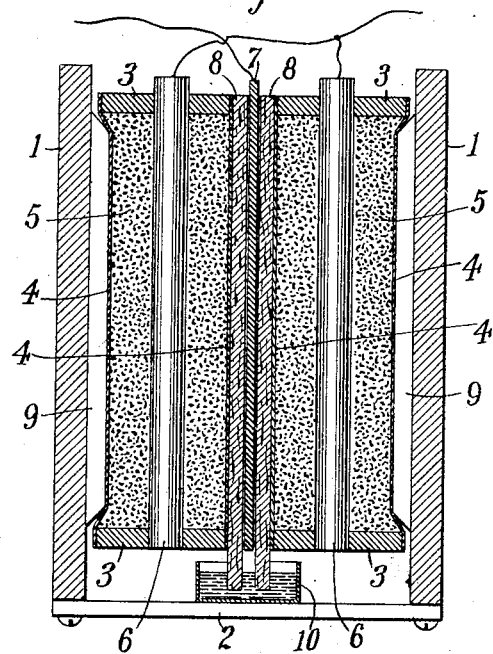
Figure 2:
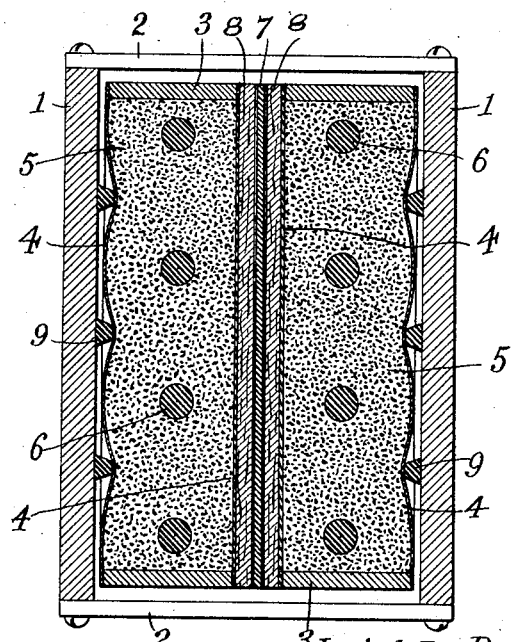

Referring now to the drawings, which show a type of the novel form mentioned above, Figure 1 is a transverse section of the same, and Fig. 2 is a horizontal section.

The sides of the cell are preferably formed by plates 1 1 and the ends by strips 2 2, usually of wood, united in any convenient manner.

3 3 are wooden frames of suitable size having their open sides covered by sheets of cloth 4 4, the whole forming a pair of receptacles which are filled with a mass of conducting and depolarizing material 5. Through one side of each of the frames, preferably the upper side, extend a number of carbon rods 6.

The conducting and depolarizing materials mentioned are usually utilized in the form of a paste made of powdered conducting carbon and powdered manganese dioxid, wet with a solution of zinc chlorid. The positive element, a sheet of zinc 7, is covered on both sides with a liquid-absorbing medium 8 8, such as blotting-paper or wood-pulp, which is moistened with a solution of zinc chlorid.

The parts described are assembled as shown in the drawings. In order to provide large spaces for circulation of the surrounding atmosphere and to aid in holding the parts firmly and closely together, a number of strips 9 are provided bearing against the cloth sides of the depolarizer-receptacles.

The primary action of the battery whereby the electric energy is produced is well known. However, instead of the oxygen of the manganese dioxid being used up it is constantly renewed by that absorbed from the air. The life of the battery is therefore limited only by the zinc plate, and when the latter is consumed the battery may be readily renewed simply by inserting a new zinc.

In order that the cell may always be ready for action, there must be some moisture in the absorbent covering of the zinc and in the mass which is in contact with the conducting-carbons. To insure this effect, a solution of a deliquescent salt, such as chlorid of zinc, is used, as before mentioned. However, in a very dry atmosphere chlorids, no matter how deliquescent they may be, will tend to crystallize. To provide against such conditions, a pan 10 may be employed for holding a quantity of water into which the absorbent covering of the zinc dips, thereby taking up water by capillary attraction.

If desired, the whole battery may be constructed dry. In that case a deliquescent salt solution is put into the pan 10 and will be drawn therefrom by the covering of the zinc until the various parts are moistened, whereupon the cell is ready for use.

It is obvious, of course, that other oxids than manganese dioxid may be used as depolarizers, such as the oxids of copper, silver, mercury, platinum, &c. Black or finely-divided platinum acts best, but is too costly for general use.

What I claim is—

1. In an electric dry battery, in combination, a positive element, a negative element, a depolarizing agent, and means whereby the oxygen consumed in the operation of the battery is replaced by oxygen from the air, as set forth.

2. In an electric dry battery, in combination, a positive element, a negative element, a depolarizing agent, and means for permitting circulation of air around the negative element, as set forth.

3. In an electric battery, in combination, a positive element, a separator of absorbent material, a negative element consisting of one or more conductors in contact with a plurality of powdered or granulated substances, one or more of which is conducting, wet with a conducting solution, and means for supplying air to the negative element, as set forth.

4. In an electric battery, in combination, a positive element, a separator of absorbent material, a negative element consisting of one or more conductors in contact with a mass of conducting and depolarizing substances wet with a solution of a deliquescent substance, and means for supplying oxygen to the depolarizing substance or substances in the negative element, as set forth.

5. An element for electric batteries comprising, in combination, a receptacle having two opposite sides formed of porous, absorbent material, one or more carbon conductors extending into said receptacle, and a mass of conducting and depolarizing materials wet with a solution of a deliquescent substance in the receptacle in contact with the carbon conductors, as set forth.

6. In an electric dry battery, in combination, an outer receptacle, a positive element, and a porous separator, of a negative element consisting of one or more carbon conductors surrounded by a mass of conducting and depolarizing materials in a receptacle having porous walls, all wet with a conducting liquid, and a plurality of devices on the inner surface of the outer receptacle to form air-spaces between said outer receptacle and the porous walls of the negative element, as set forth.

7. In an electric battery, the combination with a positive element, a negative element, and an absorbent separator between the elements, of a receptacle for holding a liquid into which the separator extends, whereby the latter is kept constantly moist, as set forth.

8. In an electric dry battery, in combination, a sheet of zinc constituting a positive element, a layer of absorbent material on each side of said sheet of zinc, and negative elements each consisting of a receptacle having a plurality of porous walls, one or more carbon conductors extending into said receptacle, and a mass of conducting and depolarizing materials surrounding the carbon conductors in the receptacle, said layers of absorbent material and the negative elements being wet with a conducting liquid, and means for holding the elements in assembled position, as set forth.

ISAIAH L. ROBERTS.

Witnesses:
M. LAWSON DYER,
S. S. DUNHAM.